US008922349B2

(12) United States Patent
Beij

(10) Patent No.: US 8,922,349 B2
(45) Date of Patent: Dec. 30, 2014

(54) CONTROL CIRCUIT, SYSTEM FOR OPERATING A DEVICE AND DEVICE FOR PROGRAMMING SUCH A CONTROL CIRCUIT

(75) Inventor: Marcel Beij, Eindhoven (NL)

(73) Assignee: Koninklijke Phiips N.V., Eindhoven (NL)

( * ) Notice: Subject to any disclaimer, the term of this patent is extended or adjusted under 35 U.S.C. 154(b) by 902 days.

(21) Appl. No.: 12/531,701

(22) PCT Filed: Mar. 26, 2008

(86) PCT No.: PCT/IB2008/051116
§ 371 (c)(1), (2), (4) Date: Sep. 17, 2009

(87) PCT Pub. No.: WO2008/117244
PCT Pub. Date: Oct. 2, 2008

(65) Prior Publication Data
US 2010/0085164 A1 Apr. 8, 2010

(30) Foreign Application Priority Data
Mar. 27, 2007 (EP) .................................... 07104946

(51) Int. Cl.
*H04Q 5/22* (2006.01)
*H05B 37/02* (2006.01)

(52) U.S. Cl.
CPC .................................. *H05B 37/0272* (2013.01)
USPC .......................................................... 340/10.5

(58) Field of Classification Search
CPC .................................................. H05B 37/0272
USPC .............. 340/12.22–13.38, 10.51, 10.52, 3.1, 340/3.31, 3.32, 3.52, 3.5, 3.7, 3.71, 5.25
See application file for complete search history.

(56) References Cited

U.S. PATENT DOCUMENTS

| | | | | |
|---|---|---|---|---|
| 5,352,957 | A | 10/1994 | Werner | |
| 6,285,295 | B1 * | 9/2001 | Casden | 340/12.24 |
| 7,102,502 | B2 * | 9/2006 | Autret | 340/505 |
| 8,010,319 | B2 * | 8/2011 | Walters et al. | 702/183 |
| 2002/0002444 | A1 | 1/2002 | Williams et al. | |
| 2002/0047774 | A1 * | 4/2002 | Christensen et al. | 340/3.54 |
| 2003/0020595 | A1 | 1/2003 | Wacyk | |
| 2003/0071927 | A1 * | 4/2003 | Park et al. | 348/734 |
| 2003/0155869 | A1 | 8/2003 | Mollema et al. | |
| 2004/0070516 | A1 * | 4/2004 | Nielsen | 340/825.72 |

(Continued)

FOREIGN PATENT DOCUMENTS

| | | | |
|---|---|---|---|
| WO | 2004023849 | A1 | 3/2004 |
| WO | 2004057927 | A1 | 7/2004 |

(Continued)

*Primary Examiner* — Omer S Khan
*Assistant Examiner* — Bhavin M Patel

(57) ABSTRACT

A control circuit and system for controlling operation of a device is provided. The control circuit includes a storage means for storing a group identifier associated with a group of devices to be controlled. The control circuit further includes a control communication interface circuit for communicating with at least one other control circuit thereby enabling one or more the control circuits to be programmed as belonging to the group. The system comprises a master control circuit for transmitting a control command, and a slave control circuit for receiving the control command. The slave control circuit is coupled to the device for controlling the device in accordance with the control command.

15 Claims, 2 Drawing Sheets

(56) References Cited

U.S. PATENT DOCUMENTS

| | | | | |
|---|---|---|---|---|
| 2005/0052287 | A1 * | 3/2005 | Whitesmith et al. | 340/825.72 |
| 2006/0109203 | A1 | 5/2006 | Huber et al. | |
| 2008/0211427 | A1 * | 9/2008 | Budde et al. | 315/294 |

FOREIGN PATENT DOCUMENTS

| | | | |
|---|---|---|---|
| WO | 2006111934 | A1 | 10/2006 |
| WO | 2006129227 | A2 | 12/2006 |
| WO | 2007029186 | A2 | 3/2007 |

* cited by examiner

CONTROL CIRCUIT, SYSTEM FOR OPERATING A DEVICE AND DEVICE FOR PROGRAMMING SUCH A CONTROL CIRCUIT

FIELD OF THE INVENTION

The present invention relates to a system for operating a lamp, in particular for controlling the operation of the lamp and relates to a device for programming a part of such a system.

BACKGROUND OF THE INVENTION

In a prior art lighting system, a number of lighting devices are coupled. The coupling provides control of the number of lighting devices by a single switch or remote control device, for example. The lighting device(s) and/or control device(s) may be coupled by cabling or may be coupled through a wireless connection. In particular in case of a wireless connection, but also in some cabling structures, each lighting device is to be provided with a lighting system identification in order to be able to respond to any signal intended for said lighting device.

For example, if a first and a second wireless lighting system are arranged close to each other, a signal transmitted to each lighting device of the first lighting system may also be received by one or more lighting devices of the second lighting system. In order to distinguish between the signals, a lighting group identifier, e.g. a group number, may be included in the signal and may be compared to a group identifier as present in the lighting device. If the received group identifier and the present group identifier match, the lighting device may respond to the signal.

In the known lighting system, a group identifier is provided in the lighting device during manufacturing. A set of lighting devices, or lighting device control circuits, are packaged together such that a user may buy a set of devices being provided with a same group identifier. For example, using a master-slave topology, a master device may be provided with a presence detector, and the slave devices may be configured to respond to the one master device by switching the lighting device on, when the presence of a person is detected. However, if the number of packaged control devices is too small, not every lighting device in a user-defined area may be connected to the master control device, or if the number is too large, a number of control devices cannot be used.

OBJECT OF THE INVENTION

It is an object of the present invention to provide a method, device and system for enabling a user to provide a group identifier to a device, such as a control device.

SUMMARY OF THE INVENTION

The above object is achieved in a control circuit according to claim 1, an assembly according to claim 7, a system according to claim 9, a programming device according to claim 13 and a method according to claim 15.

In the control circuit according to the present invention, a control communication interface circuit is provided for communicating with another control circuit. The communication may be, as mentioned above, wired or wireless communication. It is noted that the present invention is in particular suitable for use in a control circuit that may receive a control command that is not intended for said control circuit such as a wirelessly transmitted control command intended for a control circuit comprised in another group of control circuits.

The control circuit according to the present invention further comprises a storage means for storing a group identifier. The group identifier defines to which group of control circuits the control circuit belongs. The control circuit will only respond to a control command that is received by the control communication interface circuit and which control command indicates that the command is intended for control circuits comprised in the group identified by said group identifier. The group identifier may be a number, for example, but may as well be any other suitable character, string, or the like.

To enable programming an identifier communication interface circuit, in particular comprising a RF-ID (radio-frequency identification) module, is provided. The identifier communication interface circuit is configured to receive a group identifier. Further, the identifier communication interface circuit is coupled to the storage means. Thus, a received group identifier can be transmitted to the storage means to be stored therein. By storing the group identifier in the storage means, the control circuit is comprised in the group identified by that group identifier.

It is noted that the storage means may be configured to store one group identifier or to store multiple group identifiers. If one group identifier can be stored, the control circuit can be comprised in only one group. If another group identifier is provided through the identifier communication interface circuit, the previously stored group identifier may be deleted. If multiple group identifiers may be stored, the control circuit may be comprised in multiple groups. So, if another group identifier is provided, the previously stored group identifier(s) do not have to be deleted.

In an embodiment, the control communication interface circuit comprises a receiver circuit for receiving a control command and the control circuit is coupled to the device for operating the device in accordance with the control command. Thus, the control circuit is configured to receive a control command and control a coupled device in accordance with the control command. To such an embodiment may hereinafter be referred as a slave control circuit. The device may be a lamp, as mentioned in relation to the prior art, but may as well be any other electrical appliance, such as a radio, an airconditioner, and other electrically operated devices.

In an embodiment, the control communication interface circuit comprises a transmitter circuit for transmitting a control command and the control circuit is coupled to a command input circuit for generating the control command. The command input circuit may be any kind of circuit that is suitable to generate a control command in response to an external or internal condition. To such an embodiment may hereinafter be referred as a master control circuit. For example, the command input circuit may comprise a sensor circuit for controlling the device in response to an output of the sensor circuit. The sensor circuit may be a presence detector for determining whether a person is present in its vicinity. If a person is present, the control circuit may transmit a control command in order to switch a lamp on, to switch a radio or an airconditioner on, or to control any other device coupled to a slave control circuit comprised in the same group of control circuits. The command input circuit may as well, or instead, comprise a remote control device for controlling the device in response to a user input. The remote control device is provided with a user interface for receiving user input. The master control circuit receives a signal corresponding to the user input and generates a corresponding control command. The control command is then transmitted to each slave control circuit comprised in the same group of control circuits, i.e. being provided with the same group identifier.

In an embodiment, the control circuit is configured to operate both as a master and as a slave.

In an embodiment, the control circuit is comprised in an assembly. The assembly further comprises a device, such as a lamp driving circuit (ballast circuit), a radio or an airconditioner or any other electrically operated device or appliance.

The present invention further provides a system for controlling operation of a device. The system comprises a master control circuit for transmitting a control command; and a slave control circuit for receiving the control command. The slave control circuit is coupled to the device for controlling the device in accordance with the control command. At least one of the master control circuit and the slave control circuit comprises a storage means for storing a group identifier, the group identifier corresponding to said group; and an identifier communication interface circuit, in particular comprising a radio-frequency identification, RF-ID, module, for receiving the group identifier, the identifier communication interface circuit being coupled to the storage means for storing the group identifier.

In an embodiment, the master control circuit or the slave control circuit is preprogrammed during manufacturing, while the other control circuit may be programmed during installation to match the preprogrammed control circuit.

The present invention further provides a programming device for programming a control circuit according to present invention, wherein the programming device comprises a means for receiving a group identifier; and a means for supplying the group identifier to the identifier communication interface circuit of the control circuit. In an embodiment, the means for receiving a group identifier comprises a RF-ID reader module for receiving the group identifier from the RF-ID module of a second control circuit according to the present invention.

For matching a number of control circuits, the programming device is configured to receive the group identifier. The group identifier may be input by a user using a keypad, for example, or may be received from another already programmed control circuit. The input or received group identifier may be provided to the control circuit, e.g. using a RF-ID transponder. Such an RF-ID transponder is a simple to use and low-cost device. It is noted that the control circuit may be (re)programmed upon installation, but also after installation, since the programming may be performed wireless, thus without requiring any physical connection between programming device and control circuit.

The present invention further provides a method for programming a control circuit according to the present invention.

BRIEF DESCRIPTION OF THE DRAWINGS

Hereinafter, the present invention is elucidated with reference to the appended drawings showing non-limiting embodiments and wherein FIG. 1 schematically illustrates an embodiment of a system according to the present invention.

DETAILED DESCRIPTION OF EXAMPLES

Figure 1:
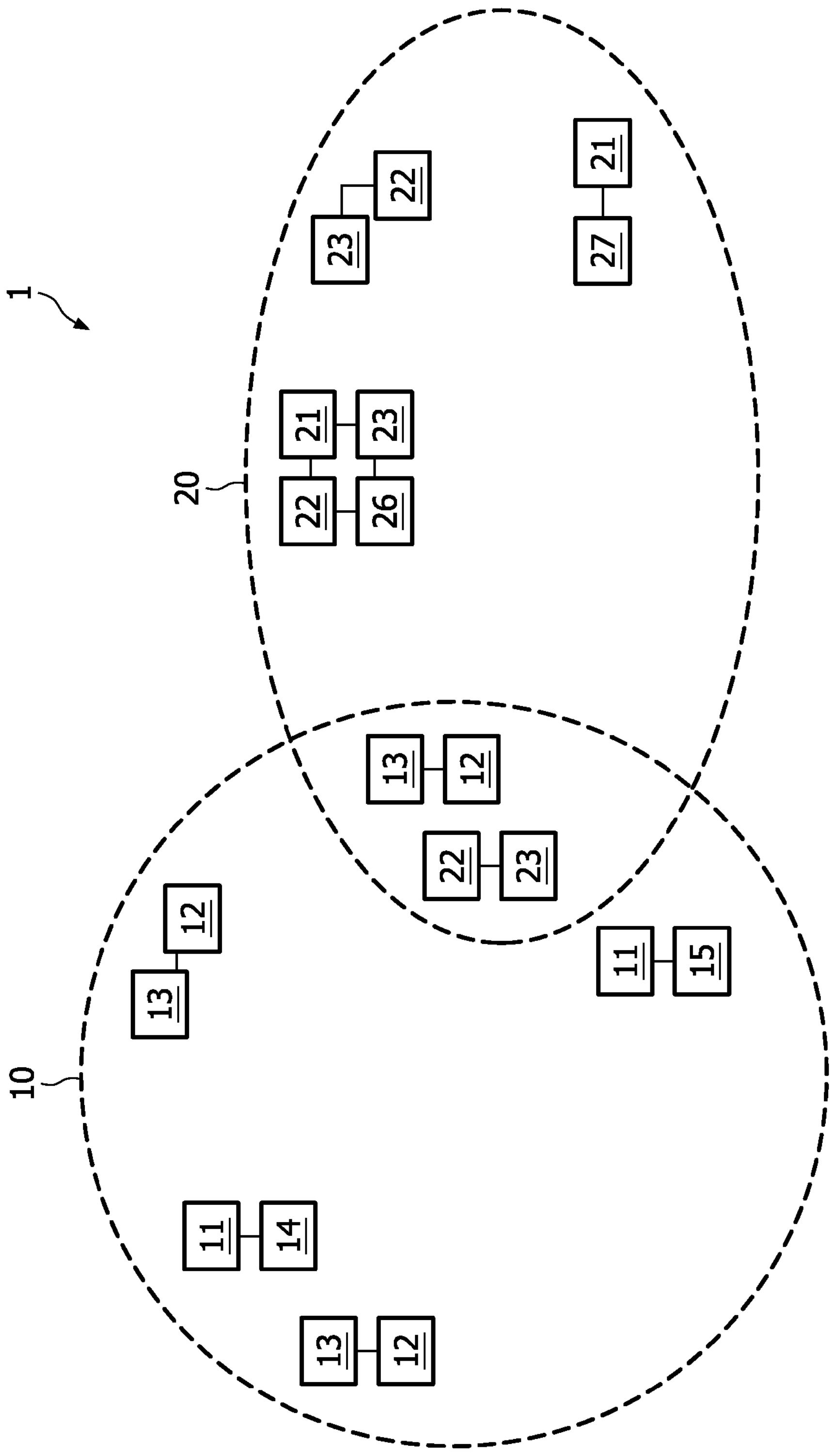

In the drawings, similar reference numerals refer to similar elements. Further, hereinafter, it is assumed that the identifier communication interface circuit comprises a RF-ID module, but it is stipulated that the present invention is not limited to such an embodiment. Also other communication techniques, in particular short-range communication techniques such as Bluetooth technology may be applied instead.

FIG. 1 illustrates a system 1 for controlling a lighting condition e.g. in a house or office. The system 1 is divided in two groups: a first group 10 and a second group 20. Each group 10, 20 comprises at least one master control circuit 11, 21 and comprises at least one slave control circuit 12, 22. Further, a number of lighting devices 13, 23, such as an incandescent lamp, a fluorescent lamp, and any other type of lamp, is present. In the first group 11, a presence detector 14 and a remote control device 15 are provided. In the second group 12 a lighting sensor 26 and a switch 27 are provided.

The position of each of the control circuits 11, 12, 21, 22 and the respective devices 13, 14, 15, 23, 26, 27 is randomly selected in order to suggest a certain position in a real-world environment, such as a building. The dashed lines 10, 20 indicate an area in which all control circuits and devices comprised in the corresponding group are positioned. Referring to the overlapping area, the control circuit 22 may be positioned between a number of control circuits 11, 12 of the first group 10, while functionally being linked to the control circuits 21, 22 of the second group 20.

Referring to the first group 11, the remote control device 15 and the presence detector 14 are each coupled to a respective master control circuit 11. Each master control circuit 11 is provided with a first group identifier, e.g. the number ‘1’. Three lighting devices 13 are each coupled to a respective slave control circuit 12. Each slave control circuit 12 is likewise provided with the first group identifier.

Referring to the second group 12, the lighting sensor 26 and the switch 27 are each coupled to a respective master control circuit 21. Each master control circuit 21 is provided with a second group identifier, e.g. the number ‘2’. Three lighting devices 23 are each coupled to a respective slave control circuit 22. Each slave control circuit 22 is likewise provided with the second group identifier.

When a user operates the remote control device 15 or the presence detector 14 determines that a person is present in its vicinity, the respective master control circuit 11 is instructed to transmit a control command, e.g. to switch on the lighting devices 13. Hereinafter, it is assumed that the communication between the control circuits 11, 12 is performed wireless, although the invention is not restricted to wireless communication. Thus, a control command signal is wirelessly transmitted by the master control circuit 11. Each slave control circuit 12, 22 within a certain range from the master control circuit 11 may receive the control command signal. Since a content of the control command signal indicates that the command is directed at the control circuits 11, 12 of the first group 10, the control circuits 21, 22 of the second group 20 will ignore the command comprised in the control command signal.

It is noted that the control command may be a on/off command or may be any other command relating to a device coupled to the slave control circuit 12, 22. In case a lamp is coupled to the slave control circuit 12, 22, the control command may as well relate to a dimming condition, a lighting color, and the like. If the device is another kind of device such as a radio, the control command may relate to an output volume of the radio. If the device is another kind of device such as an airconditioner or heating device, the control command may relate to a desired room temperature. Of course, in a single group of control circuits and respective devices, different devices may be present. For example, in one group, a radio and a lamp may be present. If a lighting command is transmitted by a master control circuit, the control circuit coupled to the radio will ignore the command.

In the second group 20, a single lighting device is provided with a lamp 23, a lighting sensor 26, a slave control circuit 22 and a master control circuit 21. So, in operation, the lighting device is configured to receive a command from the switch 27, for example, and is configured to transmit a command in response to a condition detected by the lighting sensor 26. The master control circuit 21 and the slave control circuit 22 may be combined, or at least share one or more similar components. In particular, a RF-ID module and/or a group identifier storage means may be shared by the master control circuit 21 and the slave control circuit 22.

Figure 2:
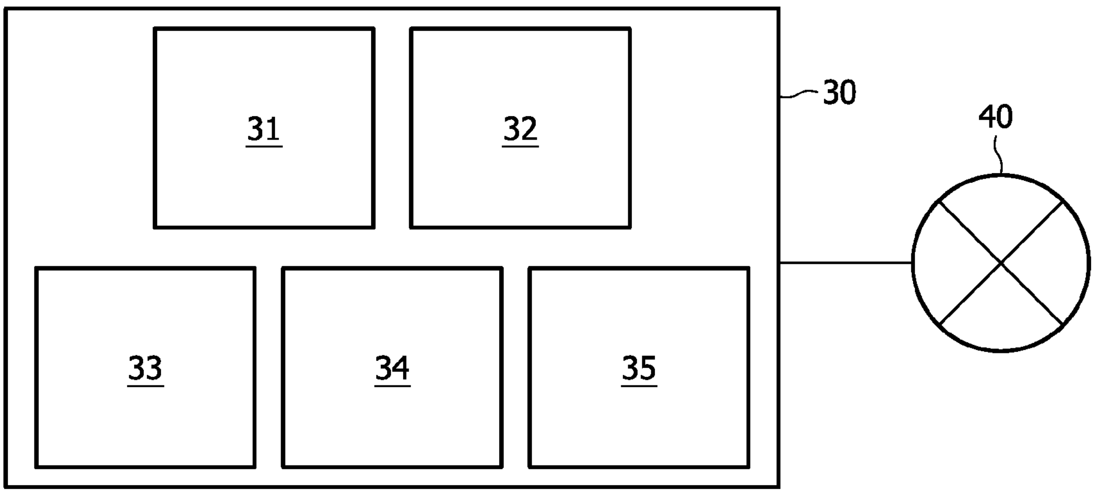
FIG. 2 schematically illustrates a control circuit according to the present invention.

In FIG. 2 an embodiment of a control circuit 30 in accordance with the present invention is shown schematically. The illustrated embodiment 30 is coupled to a lamp 40 for operating the lamp 40. The control circuit 30 comprises a control communication interface circuit 31 for communicating with another control circuit. The control circuit 30 further comprises an identifier communication interface circuit 32, in particular a RF-ID module for receiving a group identifier. The control circuit 30 also comprises a power supply 33, a storage means 34 and a controller circuit 35. The illustrated circuit parts 31-35 are all operatively coupled.

In operation, a group identifier is to be supplied to the control circuit 30 in order to enable communication through the control communication interface circuit 31. The group identifier may be supplied through the identifier communication interface circuit 32, which may be in accordance with the present invention, a RF-ID module. The RF-ID module receives the group identifier and ensures that the group identifier is stored in the storage means 34. The power supply 33 for operating the lamp 40 may be a battery. However, the power supply 33 may as well be a mains-power circuit for receiving a mains voltage and supplying a suitable voltage or current for operating the lamp 40.

When a group identifier is stored in the storage means 34 and power is available at an output of the power supply 33, a control command signal may be received by the control communication interface circuit 31. If a content of the control command signal indicates that an included command is intended for a lighting device comprised in a group identified by an included group identifier and if the included group identifier and the stored group identifier match, the controller circuit 35 may supply a supply voltage or a supply current corresponding to the command to the lamp 40.

The illustrated circuit parts 31-35 may, in a practical embodiment, be combined and/or split in another set of circuit parts. For example, the storage means 34 may be comprised in the RF-ID module 32, whereas the controller circuit 35 may be split in a first controller circuit for controlling an operation of the control circuit and a second controller circuit for controlling an operation of the lamp, for example.

Figure 3:
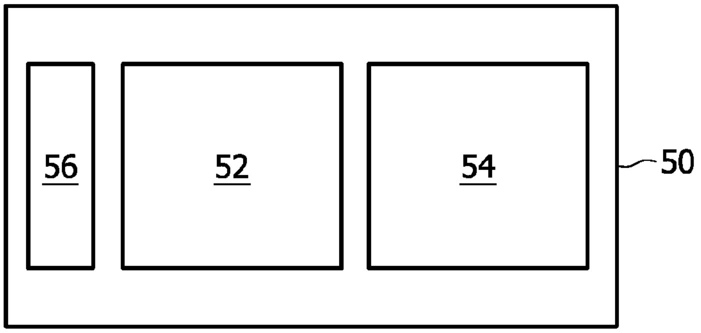
FIG. 3 schematically illustrates a programming device according to the present invention.

FIG. 3 schematically shows an embodiment of a programming device 50 for programming a control circuit in accordance with the present invention. The programming device 50 comprises a RF-ID transponder circuit 52, a RF-ID reader circuit 54 and a user input circuit 56.

In operation, the RF-ID transponder circuit 52 is configured to supply a group identifier to a RF-ID module of the control circuit according to the present invention. The group identifier to be supplied may be received from a user through the user input circuit 56 or may be received from another previously programmed control circuit using the RF-ID reader circuit 54. The RF-ID reader circuit 54 may query a RF-ID module comprised in the programmed control circuit to receive the group identifier from said programmed control circuit. Then, the received group identifier may be supplied to control circuit to be programmed.

Although detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly, and not necessarily by means of wires.

The invention claimed is:

1. A slave control circuit for controlling operation of a single device, the slave control circuit comprising:

a storage means for storing a group identifier, the group identifier corresponding to a group of control circuits; and, a control communication interface circuit for communicating with at least one master control circuit comprised in said group and for receiving a control command; wherein the slave control circuit is arranged to respond only to the control command that is received by the control communication interface and which indicates that the command is intended for control circuits comprised in the group identified by said group identifier, characterized in that:

the slave control circuit further comprises an identifier communication interface circuit for receiving the group identifier, the identifier communication interface circuit being coupled to the storage means for storing the group identifier; and, wherein the master control circuit does not contain a memory device identifying any of the control circuits to be controlled by the control command.

2. The slave control circuit according to claim 1, wherein the identifier communication interface circuit comprises a radio-frequency identification, RF-ID, module.

3. The slave control circuit according to claim 1, wherein the control communication interface circuit comprises a receiver circuit for receiving a control command and wherein the slave control circuit is coupled to the device for operating the device in accordance with the control command.

4. The slave control circuit according to claim 1, wherein the control communication interface circuit comprises a transmitter circuit for transmitting a control command and wherein the slave control circuit is coupled to a command input circuit for generating the control command.

5. The control circuit according to claim 4, wherein the control communication interface circuit comprises a sensor circuit (26) for controlling the device in response to an output of the sensor circuit.

6. The control circuit according to claim 4, wherein the control communication interface circuit comprises a remote control device (15) for controlling the device in response to a user input.

7. Assembly comprising a single device and a slave control circuit according to claim 1 for controlling only that device.

8. Assembly according to claim 7, wherein the device is a lamp and the assembly comprises a driving circuit for operating the lamp.

9. System (1) for controlling operation of a device (13, 23), the system comprising:

a master control circuit (11, 21) for transmitting a control command; a slave control circuit (12, 22) for receiving the control command, the slave control circuit being coupled to the device (13, 23) for controlling the device in accordance with the control command;

wherein the slave control circuit comprises an identifier communication interface circuit (32) for receiving a group identifier, the identifier communication interface circuit being coupled to a storage means (34) contained in the slave control circuit for storing the group identifier and wherein the group identifier corresponds to a group of control circuits; and, wherein the master control circuit does not contain a memory device identifying any of the control circuits to be controlled by the control command.

10. The system according to claim 9, wherein the identifier communication interface circuit comprises a radio-frequency identification, RF-ID, module.

11. System according to claim 9, wherein the master control circuit is coupled to a sensor circuit (26) for controlling the device in response to an output of the sensor circuit.

12. System according to claim 9, wherein the master control circuit is coupled to a remote control device (15) for controlling the device in response to a user input.

13. Programming device (50) for programming a first control circuit (30) according to claim 1, wherein the programming device comprises:

a receiving means (54, 56) for receiving a group identifier; and a supply means (52) for supplying the group identifier to the identifier communication interface circuit of the first control circuit.

14. Programming device according to claim 13, wherein an identifier communication interface circuit (32) of a second control circuit (30) comprises a radio-frequency identification, RF-ID, module and the means for receiving a group identifier comprises a RF-ID reader module for receiving a group identifier from the RF-ID module of the second control circuit.

15. Method for providing a group identifier to a first control circuit (30) according to claim 1, the group identifier being the same as a group identifier of a second control circuit (30) according to claim 1, the method comprising:

receiving the group identifier from the identifier communication interface circuit (32) of the second control circuit; and supplying the received group identifier to the identifier communication interface circuit (32) of the first control circuit.

* * * * *